F. G. SCOZZAFAVA.
PIVOT SUPPORT AND RETAINER FOR AUTOMOBILE HOODS.
APPLICATION FILED JULY 27, 1920.
1,383,768.
Patented July 5, 1921.
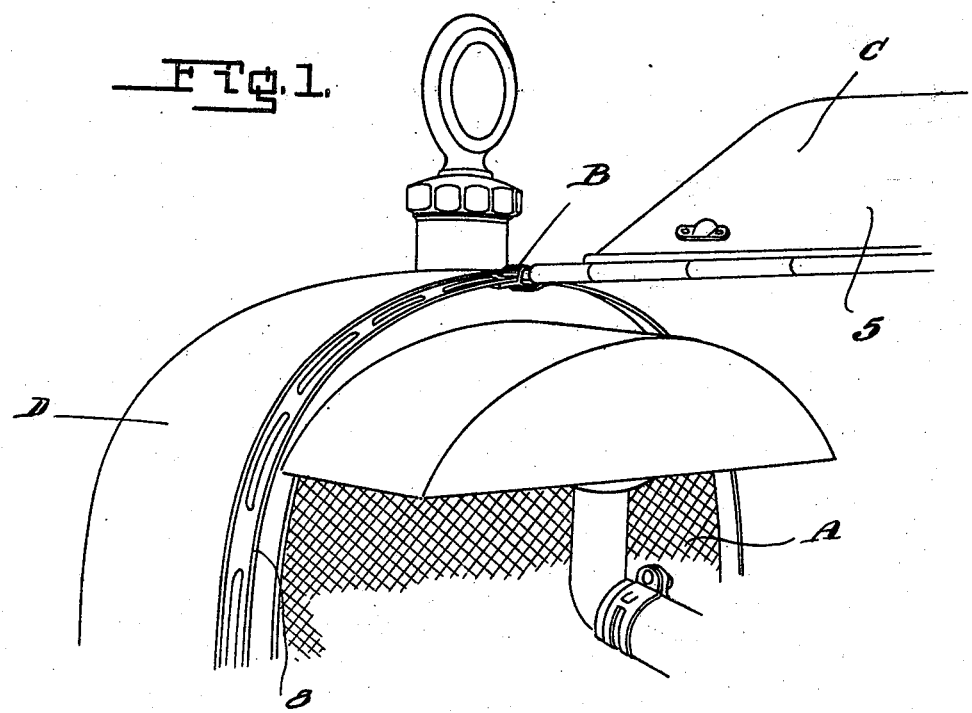
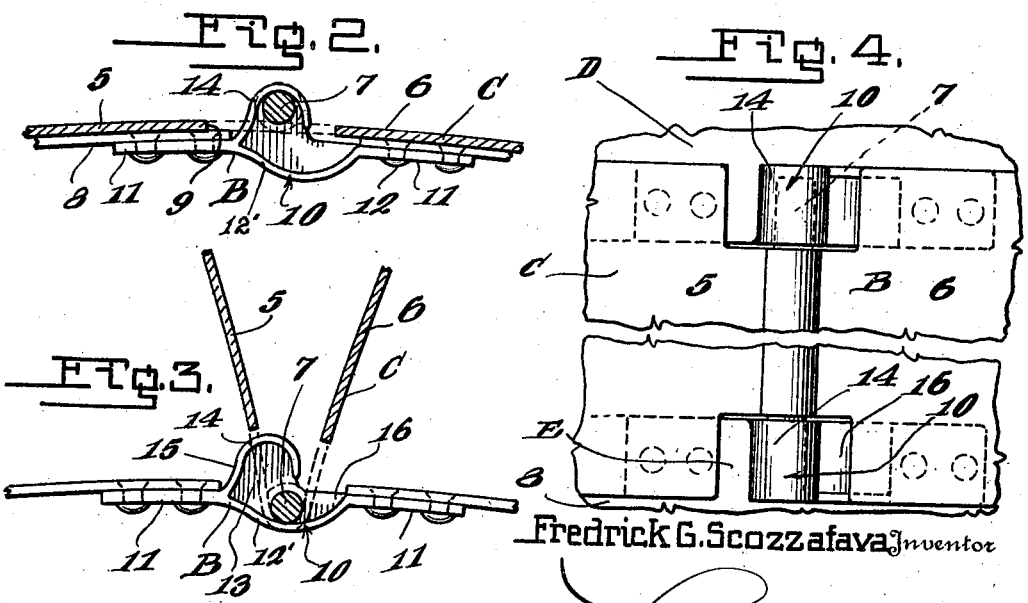
Fredrick G. Scozzafava, Inventor
By Lancaster and Allwine
Attorneys

UNITED STATES PATENT OFFICE.

FRED GABRIEL SCOZZAFAVA, OF GOUVERNEUR, NEW YORK.

PIVOT SUPPORT AND RETAINER FOR AUTOMOBILE-HOODS.

1,383,768.   Specification of Letters Patent.   Patented July 5, 1921.

Application filed July 27, 1920. Serial No. 399,269.

*To all whom it may concern:*

Be it known that I, FRED G. SCOZZAFAVA, a citizen of the United States, residing at Gouverneur, in the county of St. Lawrence and State of New York, have invented certain new and useful Improvements in Pivot Supports and Retainers for Automobile-Hoods, of which the following is a specification.

This invention relates to motor vehicles and more particularly to a means for connecting the hood in position on the vehicle body.

Considerable difficulty has heretofore been experienced with the manipulation of vehicle hoods, owing to the fact that when the hood is in a raised position for permitting access to the engine or the like, the same is liable to become misplaced by a slight jar or wind. To overcome this some manufacturers have been contemplating the use of releasable or permanent fastening devices for holding the hoods in position. While these devices, to some extent prevented the accidental displacement of the hood when in a raised position, the nature of the same prevents the easy removal of the entire hood, when desired. These objections combined with the fact that the devices are rather expensive and comparatively hard to incorporate with motor vehicles prevented the approval thereof by the public.

It is therefore a prime object of this invention to provide an improved device for vehicle hoods, which is so constructed as to permit of the convenient and easy removal of the hood from the vehicle body when desired and for effectively holding the hood against displacement when the hood is in a partially open position.

A further object of the invention is to provide an improved retaining device for vehicle hoods in which accidental displacement of the hood is absolutely prevented from the vehicle body when the wings are in a closed or partially closed position, the hood being held against accidental displacement by the weight of the hood wings. The device is also constructed as to permit the ready removal of the hood, when both of the wings thereof are in a fully raised and open position.

A still further object of the invention is to provide an improved retaining device for motor hoods which can be readily associated with existing vehicles or incorporated therewith at the time of their manufacture.

A still further object of the invention is to provide an improved device for detachably receiving the terminals of the central hood rod to hold the same against accidental displacement when the wings are in a raised position as above explained, which is durable and efficient in use, one that is simple and easy to manufacture, and one which can be placed upon the market at a relatively low cost.

Other objects of the invention will appear in the following detailed description, taken in connection with the drawings forming a part of this specification, in which drawings:

Figure 1 is a fragmentary detail perspective view of a motor vehicle showing the improved device applied thereto, one of the wings of the hood being shown in a raised position.

Fig. 2 is a fragmentary transverse cross-section through a motor vehicle hood showing the wings thereof in a lowered or closed position and illustrating the position of the hood rod when the wings are in their lowered or closed position.

Fig. 3 is a similar view, showing the wings in their raised or elevated position and showing the position of the hood rod, when the wings are in this position, whereby the rod can be easily removed from the retaining device, and Fig. 4 is a fragmentary top plan view of a hood of a motor vehicle showing the same attached by said retaining devices.

Referring to the drawings in detail, wherein similar reference characters designate corresponding parts throughout the several views the letter A generally indicates a motor vehicle of the ordinary or any preferred type and B the improved retaining device for the hood C.

The motor vehicle A includes the usual radiator D and cowl E. As clearly shown in Fig. 4 of the drawing the radiator D and cowl E are provided with the retaining devices B for reception of the hood C, and these devices are so arranged, that the same will be in direct alinement.

The hood C may be of any desired character and as shown the same includes a pair of side wings 5 and 6, which are hingedly connected together by means of the centrally positioned longitudinally arranged upper rod 7. As is usual, the terminals of the rod 7 extend in front of the edges of the hood C.

The radiator D and the cowl E are provided with the usual inwardly extending flanges 8, for the reception of the edges of the hood C and the central sections of these flanges 8 are slotted or notched, as at 9, for a purpose, which will hereinafter more fully appear. The retaining devices B are used in pairs and one of the same is secured to the flange 8 carried by the radiator D, while the other is secured to the flange 8 carried by the cowl E and as stated the retaining devices are arranged in direct alinement. Owing to the fact that motor vehicles are generally constructed along stream lines, the retaining devices may or may not be in direct horizontal alinement.

As shown each one of the pair of retaining devices B includes a body 10, which is provided with oppositely directing outwardly extending wings 11, which are riveted or otherwise secured as at 12 to the flanges 8 formed on the radiator D and the cowl E. The body 10 includes a lower arcuate guide wall 12′, one end wall 13, and a substantially semi-circular top wall 14. The top wall 14 is connected to one of the side wings 11 by means of an extension 15. As shown the top wall 14 wholly or partially houses the lower wall 12′ and terminates short of the other side wing 11. As clearly shown in Fig. 2 of the drawing the top wall 14 terminates slightly at one side of the vertical center of the body 10. The top walls 14 of the retaining devices B form hooks, for retaining the terminals of the rod 7 in place against accidental displacement, while the lower arcuate wall 12′ forms a guide for facilitating the positioning of the terminals of the rod in the housing. The space between the side wing 11 and the free terminal of the top wall 14 forms a neck or entrance 16 for the reception of the terminal of the rod 7 into the body.

When the retaining devices B are placed in position, the top or upper walls 14 thereof are placed in the slots or notches 9 formed in the flanges 8 of the radiator D and the cowl E. and are so arranged, that the open ends of the retaining devices will be facing one another.

As clearly shown in Fig. 4 of the drawing, the wings 5 and 6 of the hood C are notched, at each end thereof, to permit of the rod 7 to readily engage in the housing or body 10.

In operation of the improved retaining device, the wings 5 and 6 of the hood C are raised in a position, shown in Fig. 3 of the drawing and the terminals of the rod 7 are then inserted through the entrance or neck 16 into the housing or body 10. The terminals of the rod will be guided therein by the arcuate lower wall 12′. When the wings 5 and 6 are placed in their closed position the weight thereof will hold the rod in engagement with the upper hook shaped wall 14 and prevent the disengagement of the rod therefrom. When one of the wings is raised to permit access to the engine, the weight of the other wing will still hold the rod 7 in its raised position in the hook shaped upper wall 14 and thereby prevent the accidental displacement of the hood. It can be seen that by merely raising the wings 5 and 6 of the hood and pushing down on the same that the rod 7 can be readily slipped out of the hook shaped upper wall 14 and removed from the retaining devices.

From the foregoing description, it can be seen that an improved retaining device has been provided for motor vehicles, which is of a simple and durable construction and which will permit of the easy and convenient association of hoods with motor vehicle bodies and will prevent accidental displacement of the hood from position, when one of the wings is in a raised position or partially raised position.

Changes in details may be made without departing from the spirit or scope of this invention, but what I claim as new is, 1. In a motor vehicle, the combination with a stationary retaining member including an upper rest wall, of a movable hood including a body and a rod, the rod being normally held in engagement with the rest wall by the weight of the hood body, and a lower guide wall connected at one end with the rest wall and arranged for guiding the rod toward and from the rest wall.

2. In a motor vehicle, the combination with a pair of spaced retaining members each including a substantially hook shaped wall, of an automobile hood and means carried by the hood arranged to engage said spaced retaining members, said means being adapted to be held in engagement with said hook shaped walls, by the weight of said hood whereby accidental displacement of the hood is prevented.

3. In a motor vehicle, the combination with a pair of spaced stationary retaining members, each member including a substantially hook shaped upper wall, and a reduced neck entrance, of a hood including a longitudinally extending rod, the terminals of the rod being adapted to engage said retaining members and be held in engagement with said hook shaped upper walls by the weight of said hood.

4. In a motor vehicle, the combination with a pair of spaced stationary retaining members, each including an upper hook shaped retaining wall, and a lower arcuate guide wall, of a hood including a pair of pivotally connected wings and a retaining rod, the terminals of the rod being adapted to engage said retaining members and normally rest in said hook shaped upper walls.

5. In a motor vehicle, the combination with a pair of spaced stationary retaining members, each including an upper substantially hook shaped wall and a lower arcuate guide wall, means connecting one end of said hook shaped upper wall with the lower guide wall, the free end of said hook shaped upper wall terminating short of the other end of the guide wall, of a hood including a pair of hingedly connected wings, a rod connecting the wings together, the terminals of the rod being adapted to engage said retaining members and normally rest in engagement with said hook shaped upper walls, the lower walls having means for guiding the terminals of the rod into and out of operative position with said hook shaped upper walls.

6. The combination with a motor vehicle including a radiator and cowl, the radiator and cowl having inwardly extending flanges provided with central notched portions, of a pair of retaining members each including side wings and a central body, the bodies being disposed in said notched portions, means for securing the wings to said flanges, the bodies each including an arcuate lower wall and an upper substantially hook shaped retaining wall, of a hood including a pair of sections, a longitudinally extending rod connecting the sections together, the terminals of the rod being adapted to engage said members and normally rest in said hook shaped upper walls, the lower arcuate walls forming guiding means for the rod.

7. As a new article of manufacture, a hood retaining member comprising a central disposed body and a pair of outwardly extending attaching lugs, the body including a lower arcuate wall, an upper substantially semi-circular wall and an end retaining wall, the upper semi-circular wall and the lower arcuate wall being connected together at one end, the free end of the semi-circular wall terminating at a point adjacent to the central portion of the arcuate wall and at a point spaced from one end thereof.

FRED GABRIEL SCOZZAFAVA.